US012081936B2

(12) United States Patent
Goh et al.

(10) Patent No.: US 12,081,936 B2
(45) Date of Patent: Sep. 3, 2024

(54) METHOD AND APPARATUS FOR A FRAGMENTED RADIAL SOUND BOX HUB DEVICE

(71) Applicant: Dell Products, LP, Round Rock, TX (US)

(72) Inventors: Peng Lip Goh, Singapore (SG); Suet Chan Law, Singapore (SG); Deeder M. Aurongzeb, Austin, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 227 days.

(21) Appl. No.: 17/870,838

(22) Filed: Jul. 22, 2022

(65) Prior Publication Data

US 2024/0031733 A1 Jan. 25, 2024

(51) Int. Cl.
*H04R 1/28* (2006.01)

(52) U.S. Cl.
CPC .................................. *H04R 1/2803* (2013.01)

(58) Field of Classification Search
CPC .. H04R 1/2803; H04R 1/2873; H04R 1/2842; H04R 2201/028; H04R 2420/09
See application file for complete search history.

(56) References Cited

U.S. PATENT DOCUMENTS 7,227,566 B2 * 6/2007 Abe ....................... H04R 27/00 348/E7.083
8,201,659 B2 6/2012 Imai
9,685,144 B2 6/2017 Trinca
9,837,083 B1 * 12/2017 List .......................... H04R 1/08
2009/0288911 A1 11/2009 Chen
2010/0183185 A1 7/2010 Tsai
2018/0007465 A1 1/2018 Liu
2019/0279608 A1 9/2019 Abiko
2021/0274279 A1 9/2021 Su
2022/0150619 A1 5/2022 Park

FOREIGN PATENT DOCUMENTS

WO 2006/123460 A1 11/2006
WO 2016/138691 A1 9/2016

* cited by examiner

*Primary Examiner* — Brian Ensey
(74) *Attorney, Agent, or Firm* — Prol Intellectual Property Law, PLLC; H. Kenneth Prol

(57) ABSTRACT

A fragmented sound box hub device comprising a rounded, fragmented sound box housing having a bottom housing cover and a side ring housing having a plurality of apertures for data ports and a microphone, a sound box processor, a sound box memory device, and a sound box power management unit (PMU) disposed on a base printed circuit board (PCB) within the rounded, fragmented sound box housing, a speaker centrally disposed in the rounded, fragmented soundbox housing, and a plurality of adjacent fragmented sound chambers operatively coupled to the speaker and disposed along the speaker in the rounded, fragmented sound box housing, where a portion of the fragmented sound chambers are of a plurality of different sizes to resonate sounds produced by the speaker at a corresponding plurality of sound frequency bands.

20 Claims, 7 Drawing Sheets

METHOD AND APPARATUS FOR A FRAGMENTED RADIAL SOUND BOX HUB DEVICE

FIELD OF THE DISCLOSURE

The present disclosure generally relates to a sound box hub device. The present disclosure more specifically relates to optimizing the audio presented from a radial sound box hub device with additional functionality.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may be operatively coupled to a speaker device to allow a user to hear audio therefrom. Additionally, the information handling system may be operatively coupled to the speaker device having additional hub functionality such as to operate as a teleconferencing device or a peripherals hub.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
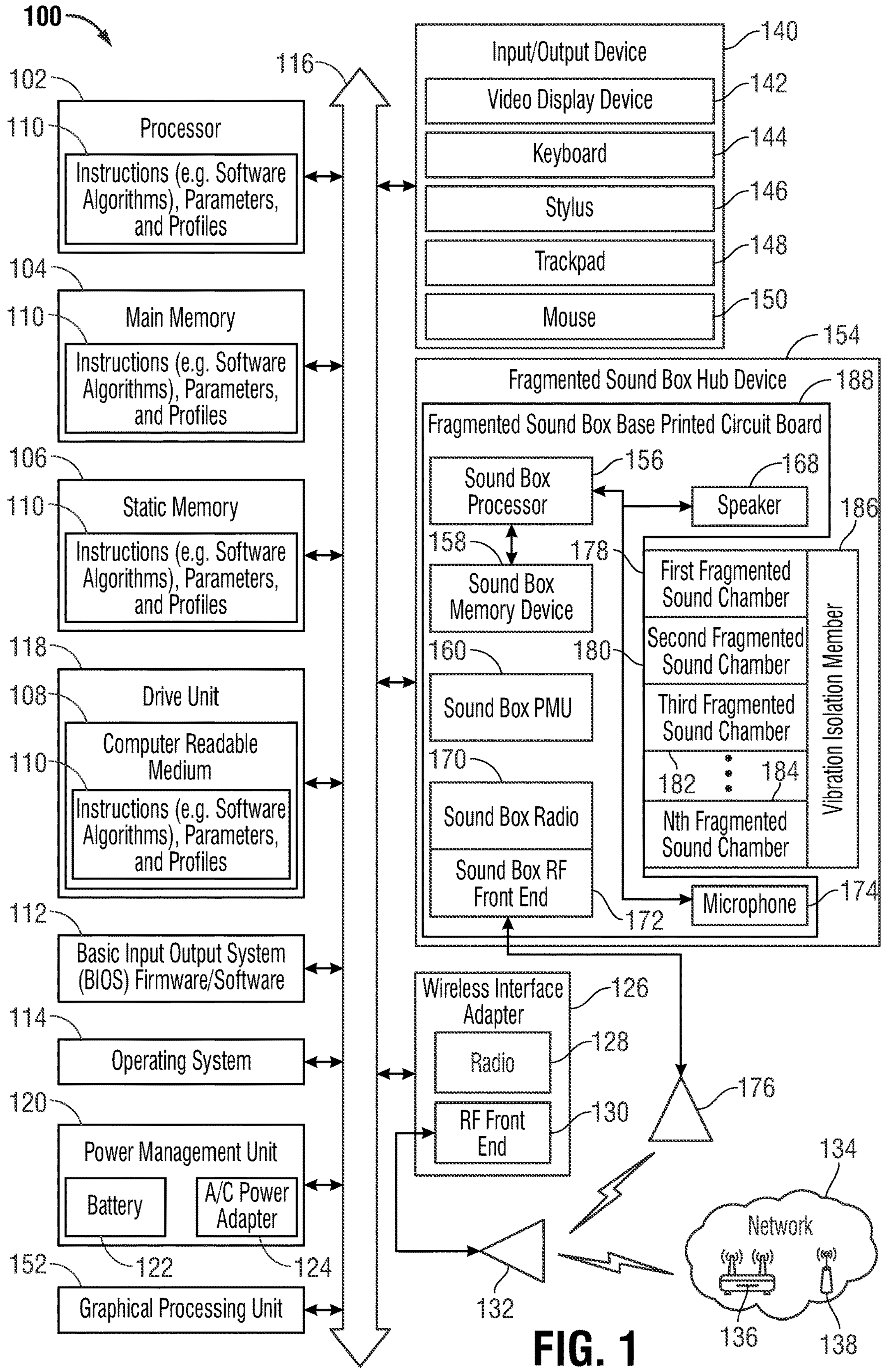
FIG. 1 is a block diagram of an information handling system with an operatively coupled fragmented sound box hub device according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Audio devices provide sound to a user. These audio devices may provide a means to a user for communicating, in an example embodiment, with others that are remotely located from the audio device. In this example, the audio device may include a speakerphone. The speakerphone may include a microphone to capture the user's voice and a speaker to provide audio to the user of the voices of the remote users participating in this conference call. Other audio devices also include, for example, virtual assistants, radios, information handling systems, and the like. Each of these audio devices may include a speaker that provides audio output regardless of the source of the audio data used to drive the speaker to produce the audio output. In the present specification and in the appended claims, such an audio device may be called a fragmented sound box, a speaker device, or other device that includes a speaker. Again, each of these include at least a speaker driven by an audio driver executing digital audio data to produce audio sound at the speaker.

The present specification describes a fragmented sound box that includes a sound box processor, a sound box memory device, a sound box power management unit (PMU). The sound box processor may interact with the sound box memory device and sound box PMU to help drive a speaker formed within the housing of the fragmented sound box. A printed circuit board (PCB) may be used to operatively couple the sound box processor, sound box memory device, sound box PMU, and speaker together. In an embodiment, the fragmented sound box includes a plurality of fragmented sound chambers auditorily coupled to the speaker, the fragmented sound chambers are sized to resonate sounds produced by the speaker at specific bands of sound frequencies. The plurality of fragmented sound chambers may be, in an example embodiment, placed next to the speaker so that, according to the sizes of each of the plurality of fragmented sound chambers, may resonate at certain frequency bands to compliment the audio produced by the speaker. In an embodiment, each of the plurality of fragmented sound chambers may produce a resonating frequency such as one or more bass frequencies, one or more treble frequencies, and one or more mid frequencies, among other frequencies.

The fragmented sound box may further include a PCB that forms a wall of one or more of the plurality of fragmented sound chambers. This allows less materials to be used to form the plurality of fragmented sound chambers and reducing the weight of the fragmented sound box as well. One or more PCBs may be used to form additional walls of each of the plurality of fragmented sound chambers as well as operatively couple additional circuits and hardware to In an embodiment, the fragmented sound box may include a geometrically-slotted flexible touch PCB mounted on a radially curved surface of a housing of the fragmented sound box. The geometrically-slotted flexible touch PCB may be mounted on a perforated plastic top surface that allows, through the perforations formed therein, audio to be emitted from the speaker and the plurality of fragmented sound chambers while preventing objects from entering the interior of the housing of the fragmented sound box. The geometrically-slotted flexible touch PCB may be operatively coupled to one or more of the PCBs within the housing of the fragmented sound box through this perforated plastic top surface. In an embodiment, the geometrically-slotted flexible touch PCB may be used to define actuatable buttons for the user to, for example, increase the volume, decrease the volume, initiate a videoconferencing session with remote users, mute the microphone, among other audio altering buttons.

In an embodiment, the perforated plastic top surface may be overlayed with a fabric formed over the perforated plastic top surface. This fabric may be stretched glued and/or inserted into portions of the housing of the fragmented sound box to secure the fabric to the fragmented sound box. Other aesthetic additions may be made to increase the desirability of the fragmented sound box to the user.

In an embodiment, the fragmented sound box may include devices and methods of preventing vibrations produced by the plurality of fragmented sound chambers and heat from the sound box processor and other hardware from effecting the fragmented sound box. To prevent vibrations from the resonant frequencies formed in the plurality of fragmented sound chambers, the fragmented sound box may include a vibration isolation member operatively coupling the plurality of fragmented sound chambers to a housing of the fragmented sound box to operatively isolate vibrations from the plurality of fragmented sound chambers from the housing. To prevent heat from effecting the outer temperature of the housing of the fragmented sound box, a graphene coating may be coated on interior surfaces of the housing. The graphene may dissipate heat better than other coatings or the materials of the housing alone.

The fragmented sound box may further include one or more connections that allow the fragmented sound box to be operatively coupled to one or more peripheral devices and/or an information handling system via a wired connection. Still further, in an example embodiment, the fragmented sound box may include a sound box radio, sound box radio frequency (RF) front end, and antenna to wirelessly couple the fragmented sound box to a peripheral device and/or an information handling system.

FIG. 1 illustrates an information handling system 100 similar to information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a convertible laptop, a tablet, a smartphone, a communications device, an access point (AP), a base station transceiver, a wireless telephone, a control system, a camera, a scanner, a printer, a personal trusted device, a web appliance, a companion hub, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video, or data communication. For example, an information handling system 100 may be any mobile or other computing device capable of executing a set of instructions (sequential or otherwise) that specify actions to be taken by that machine. In an embodiment, the information handling system 100 may be operatively coupled to a server or other network device as well as with any other network devices such as a fragmented sound box hub device 154. Further, while a single information handling system 100 is illustrated, the term “system” shall also be taken to include any collection of systems or sub-systems that individually or jointly execute a set, or multiple sets, of instructions to perform one or more computer functions.

The information handling system 100 may include memory (volatile (e.g., random-access memory, etc.), nonvolatile (read-only memory, flash memory etc.) or any combination thereof), one or more processing resources, such as a central processing unit (CPU), a graphics processing unit (GPU) 152, processing, hardware, controller, or any combination thereof. Additional components of the information handling system 100 can include one or more storage devices, one or more communications ports for communicating with external devices, as well as, various input and output (110) devices 140, such as a keyboard 144, a mouse 150, a video display device 142, a stylus 146, a trackpad 148, or any combination thereof. The information handling system 100 can also include one or more buses 116 operable to transmit data communications between the various hardware components described herein. Portions of an information handling system 100 may themselves be considered information handling systems and some or all of which may be wireless.

Information handling system 100 can include devices or modules that embody one or more of the devices or execute instructions for the one or more systems and modules described above, and operates to perform one or more of the methods described herein. The information handling system 100 may execute code instructions 110 via processing resources that may operate on servers or systems, remote data centers, or on-box in individual client information handling systems according to various embodiments herein. In some embodiments, it is understood any or all portions of code instructions 110 may operate on a plurality of information handling systems 100.

The information handling system 100 may include processing resources such as a processor 102 such as a central processing unit (CPU), accelerated processing unit (APU), a neural processing unit (NPU), a vision processing unit (VPU), an embedded controller (EC), a digital signal processor (DSP), a GPU 152, a microcontroller, or any other type of processing device that executes code instructions to perform the processes described herein. Any of the processing resources may operate to execute code that is either firmware or software code. Moreover, the information handling system 100 can include memory such as main memory 104, static memory 106, computer readable medium 108 storing instructions 110 of, in an example embodiment, an audio application, or other computer executable program code, and drive unit 118 (volatile (e.g., random-access memory, etc.), nonvolatile (read-only memory, flash memory etc.) or any combination thereof).

As shown, the information handling system 100 may further include a video display device 142. The video display device 142, in an embodiment, may function as a liquid crystal display (LCD), an organic light emitting diode (OLED), a flat panel display, or a solid-state display. Although FIG. 1 shows a single video display device 142, the present specification contemplates that multiple video display devices 142 may be used with the information handling system to facilitate an extended desktop scenario, for example. In an embodiment, the video display device 142 may serve as a peripheral device to the fragmented sound box hub device 154 with the fragmented sound box hub device 154 serving to operatively couple the video display device 142 to the information handling system 100 using one or more connections on the fragmented sound box hub device 154 described herein. In an example embodiment, the fragmented sound box hub device 154 may provide both audio output to a user as well as service as an intermediary device between the information handling system 100 and any peripheral device. Additionally, the information handling system 100 may include one or more input/output devices 140 including an alpha numeric input device such as a keyboard 144 and/or a cursor control device, such as a mouse 150, touchpad/trackpad 148, a stylus 146, the fragmented sound box hub device 154 that allows a user to communicate with a remote user in an example embodiment, or a gesture or touch screen input device associated with the video display device 142 that allow a user to interact with the images, windows, and applications presented to the user. In an embodiment, the video display device 142 may provide output to a user that includes, for example, one or more windows describing one or more instances of applications being executed by the processor 102 of the information handling system. In this example embodiment, a window may be presented to the user that provides a graphical user interface (GUI) representing the execution of that application.

The network interface device of the information handling system 100 shown as wireless interface adapter 126 can provide connectivity among devices such as with Bluetooth® or to a network 134, e.g., a wide area network (WAN), a local area network (LAN), wireless local area network (WLAN), a wireless personal area network (WPAN), a wireless wide area network (WWAN), or other network. In an embodiment, the WAN, WWAN, LAN, and WLAN may each include an access point 136 or base station 138 used to operatively couple the information handling system 100 to a network 134 and, in an embodiment, to a fragmented sound box hub device 154 described herein. In a specific embodiment, the network 134 may include macro-cellular connections via one or more base stations 138 or a wireless access point 136 (e.g., Wi-Fi or WiGig), or such as through licensed or unlicensed WWAN small cell base stations 138. Connectivity may be via wired or wireless connection. For example, wireless network access points 136 or base stations 138 may be operatively connected to the information handling system 100. In an embodiment, the radio 128 may be used to operatively couple the information handling system 100 to the video display device 142 wirelessly. Wireless interface adapter 126 may include one or more radio frequency (RF) subsystems (e.g., radio 128) with transmitter/receiver circuitry, modem circuitry, one or more antenna front end circuits 130, one or more wireless controller circuits, amplifiers, antennas 132 and other circuitry of the radio 128 such as one or more antenna ports used for wireless communications via multiple radio access technologies (RATs). The radio 128 may communicate with one or more wireless technology protocols. In and embodiment, the radio 128 may contain individual subscriber identity module (SIM) profiles for each technology service provider and their available protocols for any operating subscriber-based radio access technologies such as cellular LTE communications.

In an example embodiment, the wireless interface adapter 126, radio 128, and antenna 132 may provide connectivity to one or more of the peripheral devices that may include a wireless video display device 142, a wireless keyboard 144, a wireless mouse 150, a wireless headset, a microphone, an audio headset, a wireless stylus 146, and a wireless trackpad 148, among other wireless peripheral devices used as input/output (I/O) devices 140. In an alternative embodiment, a sound box radio 170 and companion sound box RF front end 172 and sound box antenna 176 may be used to operatively couple each of these peripheral devices (input/output devices 140) to the information handling system 100 passing input/output through the fragmented sound box hub device 154.

The wireless interface adapter 126 may include any number of antennas 132 which may include any number of tunable antennas for use with the system and methods disclosed herein. Although FIG. 1 shows a single antenna 132, the present specification contemplates that the number of antennas 132 may include more or less of the number of individual antennas shown in FIG. 1. Additional antenna system modification circuitry (not shown) may also be included with the wireless interface adapter 126 to implement coexistence control measures via an antenna controller in various embodiments of the present disclosure.

In some aspects of the present disclosure, the wireless interface adapter 126 may operate two or more wireless links. In an embodiment, the wireless interface adapter 126 may operate a Bluetooth® wireless link using a Bluetooth® wireless or Bluetooth® Low Energy (BLE). In an embodiment, the Bluetooth® wireless protocol may operate at frequencies between 2.402 to 2.48 GHz. Other Bluetooth® operating frequencies such as Bluetooth® operating frequencies such as 6 GHz are also contemplated in the presented description. In an embodiment, a Bluetooth® wireless link may be used to wirelessly couple the input/output devices operatively and wirelessly including the mouse 150, keyboard 144, stylus 146, trackpad 148, and/or video display device 142 to the bus 116 in order for these devices to operate wirelessly with the information handling system 100. In a further aspect, the wireless interface adapter 126 may operate the two or more wireless links with a single, shared communication frequency band such as with the 5G or WiFi WLAN standards relating to unlicensed wireless spectrum for small cell 5G operation or for unlicensed Wi-Fi WLAN operation in an example aspect. For example, a 2.4 GHz/2.5 GHz or 5 GHz wireless communication frequency bands may be apportioned under the 5G standards for communication on either small cell WWAN wireless link operation or Wi-Fi WLAN operation. In some embodiments, the shared, wireless communication band may be transmitted through one or a plurality of antennas 132 may be capable of operating at a variety of frequency bands. In an embodiment described herein, the shared, wireless communication band may be transmitted through a plurality of antennas used to operate in an N×N MIMO array configuration where multiple antennas 132 are used to exploit multipath propagation which may be any variable N. For example, N may equal 2, 3, or 4 to be 2×2, 3×3, or 4×4 MIMO operation in some embodiments. Other communication frequency bands, channels, and transception arrangements are contemplated for use with the embodiments of the present disclosure as well and the present specification contemplates the use of a variety of communication frequency bands.

The wireless interface adapter 126 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, or similar wireless standards may be used. Wireless interface adapter 126 may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the −5 MHz frequency band such as 802.11 a/h/j/n/ac/ax (e.g., center frequencies between 5.170-7.125 GHz). WLAN, for example, may operate at a 2.4 GHz band, 5 GHz band, and/or a 6 GHz band according to, for example, Wi-Fi, Wi-Fi 6, or Wi-Fi 6E standards. WWAN may operate in a number of bands, some of which are proprietary but may include a wireless communication frequency band. For example, low-band 5G may operate at frequencies similar to 4G standards at 600-850 MHz. Mid-band 5G may operate at frequencies between 2.5 and 3.7 GHz. Additionally, high-band 5G frequencies may operate at 25 to 39 GHz and even higher. In additional examples, WWAN carrier licensed bands may operate at the new radio frequency range 1 (NRFR1), NFRF2, bands, and other known bands. Each of these frequencies used to communicate over the network 134 may be based on the radio access network (RAN) standards that implement, for example, eNodeB or gNodeB hardware connected to mobile phone networks (e.g., cellular networks) used to communicate with the information handling system 100. In the example embodiment, the information handling system 100 may also include both unlicensed wireless RF communication capabilities as well as licensed wireless RF communication capabilities. For example, licensed wireless RF communication capabilities may be available via a subscriber carrier wireless service operating the cellular networks. With the licensed wireless RF communication capability, a WWAN RF front end (e.g., antenna front end 130 circuits) of the information handling system 100 may operate on a licensed WWAN wireless radio with authorization for subscriber access to a wireless service provider on a carrier licensed frequency band.

In other aspects, the information handling system 100 operating as a mobile information handling system may operate a plurality of wireless interface adapters 126 for concurrent radio operation in one or more wireless communication bands. The plurality of wireless interface adapters 126 may further share a wireless communication band or operate in nearby wireless communication bands in some embodiments. Further, harmonics and other effects may impact wireless link operation when a plurality of wireless links are operating concurrently as in some of the presently described embodiments.

The wireless interface adapter 126 can represent an add-in card, wireless network interface module that is integrated with a main board of the information handling system 100 or integrated with another wireless network interface capability, or any combination thereof. In an embodiment the wireless interface adapter 126 may include one or more radio frequency subsystems including transmitters and wireless controllers for connecting via a multitude of wireless links. In an example embodiment, an information handling system 100 may have an antenna system transmitter for Bluetooth®, BLE, 5G small cell WWAN, or Wi-Fi WLAN connectivity and one or more additional antenna system transmitters for macro-cellular communication including the earpiece 154 described herein. The RF subsystems and radios 128 and include wireless controllers to manage authentication, connectivity, communications, power levels for transmission, buffering, error correction, baseband processing, and other functions of the wireless interface adapter 126.

As described herein, the information handling system 100 may be operatively coupled to a fragmented sound box hub device 154. The fragmented sound box hub device 154 in the present disclosure may be any device that includes a speaker 168 used to provide audio to a user. In an embodiment, the sound box processor 156 may also act as a hub device that acts as an intermediary device used to couple one or more peripheral devices including the input/output devices 140 to the information handling system 100. In an embodiment, the fragmented sound box hub device 154 may also provide the or additional processing resources, data storage resources, and other resources that may be used by the information handling system 100.

The fragmented sound box hub device 154 may also include one or more fragmented sound chambers 178, 180, 182, 184. These fragmented sound chambers 178, 180, 182, 184 may each be sized to resonate at a specific sound frequency band in order to modify or enhance the sounds produced by the driving of the speaker 168. Plural fragmented sound chambers may support the same sound frequency bands in some embodiments. For example, plural fragmented sound chambers may support a bass sound frequency band in an example embodiment.

Because the air inside each of the fragmented sound chambers 178, 180, 182, 184 have its own resonance, the tone quality of the sounds produced by the speaker 168 and received within each of the fragmented sound chambers 178, 180, 182, 184 may be augmented to increase the tone quality of the sound produced by the fragmented sound box hub device 154. In an embodiment, the sizing of each of the fragmented sound chambers 178, 180, 182, 184 may be selected so that those frequencies that are enhanced more equally across frequencies.

In an embodiment, one or more of the fragmented sound chambers 178, 180, 182, 184 may be located radially around the speaker 168 placed at a central location within the housing of the fragmented sound box hub device 154. For example, a first fragmented sound chamber 178 and second fragmented sound chamber 180 may be formed between an outer portion of the speaker 168 and an inner portion of the housing of the fragmented sound box hub device 154. In an embodiment, a fragmented sound box printed circuit board (PCB) 188 may be used to form a wall of the first fragmented sound chamber 178 and second fragmented sound chamber 180 thereby decreasing the amount of material used to form the first fragmented sound chamber 178 and second fragmented sound chamber 180 while decreasing the weight of the fragmented sound box hub device 154.

In an embodiment, a third fragmented sound chamber 182 may be formed around the speaker 168 with a backside of the fragmented sound box PCB 188 and interior portions of the housing of the fragmented sound box hub device 154 forming the walls that define the size of the third fragmented sound chamber 182. The first fragmented sound chamber 178, the second fragmented sound chamber 180, or the third fragmented sound chamber 182 may be used to resonate at certain sound frequency bands to increase the tone quality of those frequency bands as described herein.

Any number of fragmented sound chambers 178, 180, 182, 184 may be formed within the housing of the fragmented sound box hub device 154. For example, a nth fragmented sound chamber 184 may be a sound chamber that, rather than being formed radially from the speaker 168, is formed below the speaker 168. In this embodiment, the hardware of the speaker 168, a fragmented sound box PCB 188, and/or the housing of the fragmented sound box hub device 154 may be used to define the size of this nth fragmented sound chamber 184 formed behind the speaker 168. Again, along with the other fragmented sound chambers 178, 180, 182, the nth fragmented sound chamber 184 may resonate at yet another sound frequency band different from the other fragmented sound chambers 178, 180, 182 thereby increasing the tone qualities of the audio emitted by the speaker 168 during operation of the fragmented sound box hub device 154.

In an embodiment, the fragmented sound box hub device 154 may include a microphone 174. The microphone 174 may be used to detect a user's voice so that a user may engage in a conversation with remotely-located participants to the conversation. For example, during execution of a videoconferencing session a user may use the microphone 174 of the fragmented sound box hub device 154 to communicate to these remotely-located participants to the conversation.

In an embodiment, the fragmented sound box hub device 154 may include one or more vibration isolation members 186. The vibration isolation member 186 may be affixed between each of the fragmented sound chambers 178, 180, 182, 184 and an interior side of the housing to reduce the amount of vibration passed to the housing of the fragmented sound box hub device 154. This prevents the resonant vibrations from each of the fragmented sound chambers 178, 180, 182, 184 from vibrating the fragmented sound box hub device 154 to a point where it can "walk" or bounce along a surface that the fragmented sound box hub device 154 has been placed. Still further, the vibration isolation members 186 may allow any of the fragmented sound chambers 178, 180, 182, 184 to vibrate according to the resonant frequency they were built for thereby allowing the sounds to propagate to the user increasing the tone qualities of the audio emitted by the fragmented sound box hub device 154 during operation of the fragmented sound box hub device 154. In an embodiment, the vibration isolation members 186 may be made of a flexible material such as a rubber that allows for the independent vibration of the fragmented sound chambers 178, 180, 182, 184 without imparting any or little vibration to the housing of the fragmented sound box hub device 154.

The fragmented sound box hub device 154 may further include a sound box processor 156 and sound box memory device 158 to execute and store computer readable program code in an embodiment. As described herein, the fragmented sound box hub device 154 may act as a hub device in some embodiments that may provide auxiliary processing and data storage resources for other devices such as the information handling system. The sound box processor 156 may, in an example embodiment, execute firmware used to operate one or more peripheral devices such as the input/output devices 140 that are operatively coupled to the fragmented sound box hub device 154 either via a wired or wireless connection. The sound box memory device 158 may be used to store any software executable by the sound box processor 156 in order to perform the functions of the fragmented sound box hub device 154 described herein.

The fragmented sound box hub device 154 may further include a sound box radio 170 and sound box RF front end 172 along with a sound box antenna 176 used to operatively couple the fragmented sound box hub device 154 to one or more peripheral devices such as the input/output devices 140 as well as the information handling system 100. In an embodiment, the sound box radio 170 may operate a Bluetooth® wireless link using a Bluetooth® wireless or Bluetooth® Low Energy (BLE). In an embodiment, the Bluetooth® wireless protocol may operate at frequencies between 2.402 to 2.48 GHz. Other Bluetooth® operating frequencies such as Bluetooth® operating frequencies such as 6 GHz are also contemplated in the presented description. In an embodiment, a Bluetooth® wireless link may be used to wirelessly couple the input/output devices 140 operatively and wirelessly including the mouse 150, keyboard 144, stylus 146, trackpad 148, and/or video display device 142 to the bus 116 in order for these devices to operate wirelessly with the fragmented sound box hub device 154 and the information handling system 100.

In an embodiment, the fragmented sound box hub device 154 may further include a sound box PMU 160 (a.k.a. a power supply unit (PSU)). The sound box PMU 160 may manage the power provided to the components of the fragmented sound box hub device 154 such as the sound box processor 156, a cooling system, one or more sound box memory devices 158, a video/graphic display device 142 operatively coupled to the fragmented sound box hub device 154. Still further, in an embodiment, the sound box PMU 160 may manage the power provided to other input/output devices 140 such as the stylus 146, a mouse 150, a keyboard 144, and a trackpad 148 and other components operatively coupled to the fragmented sound box hub device 154 that may require power when a power button has been actuated by a user on the fragmented sound box hub device 154. In an embodiment, the sound box PMU 160 may monitor power levels and be electrically coupled, either wired or wirelessly, to the information handling system 100 to provide this power and coupled, via a wired connection, to bus 116 to provide or receive data or instructions. The sound box PMU 160 may regulate power from a power source such as a battery or A/C power adapter. In an embodiment, the battery may be charged via the A/C power adapter and provide power to the components of the fragmented sound box hub device 154 via a wired connections as applicable, or when A/C power from the A/C power adapter is removed.

The information handling system 100 can include one or more set of instructions 110 that can be executed to cause the computer system to perform any one or more of the methods or computer-based functions disclosed herein. For example, instructions 110 may execute various software applications, software agents, or other aspects or components. Various software modules comprising application instructions 110 may be coordinated by an operating system (OS) 114, and/or via an application programming interface (API). An example OS 114 may include Windows®, Android®, and other OS types known in the art. Example APIs may include Win 32, Core Java API, or Android APIs.

The disk drive unit 118 and may include a computer-readable medium 108 in which one or more sets of instructions 110 such as software can be embedded to be executed by the processor 102 or other processing devices such as a GPU 152 to perform the processes described herein. Similarly, main memory 104 and static memory 106 may also contain a computer-readable medium for storage of one or more sets of instructions, parameters, or profiles 110 described herein. The disk drive unit 118 or static memory 106 also contain space for data storage. Further, the instructions 110 may embody one or more of the methods as described herein. In a particular embodiment, the instructions, parameters, and profiles 110 may reside completely, or at least partially, within the main memory 104, the static memory 106, and/or within the disk drive 118 during execution by the processor 102 or GPU 152 of information handling system 100. The main memory 104, GPU 152, and the processor 102 also may include computer-readable media.

Main memory 104 or other memory of the embodiments described herein may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The applications and associated APIs described herein, for example, may be stored in static memory 106 or on the drive unit 118 that may include access to a computer-readable medium 108 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In an embodiment, the information handling system 100 may further include a power management unit (PMU) 120 (a.k.a. a power supply unit (PSU)). The PMU 120 may manage the power provided to the components of the information handling system 100 such as the processor 102, a cooling system, one or more drive units 118, the GPU 152, a video/graphic display device 142 or other input/output devices 140 such as the stylus 146, a mouse 150, a keyboard 144, and a trackpad 148 and other components that may require power when a power button has been actuated by a user. In an embodiment, the PMU 120 may monitor power levels and be electrically coupled, either wired or wirelessly, to the information handling system 100 to provide this power and coupled to bus 116 to provide or receive data or instructions. The PMU 120 may regulate power from a power source such as a battery 122 or A/C power adapter 124. In an embodiment, the battery 122 may be charged via the A/C power adapter 124 and provide power to the components of the information handling system 100 via a wired connections as applicable, or when A/C power from the A/C power adapter 124 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
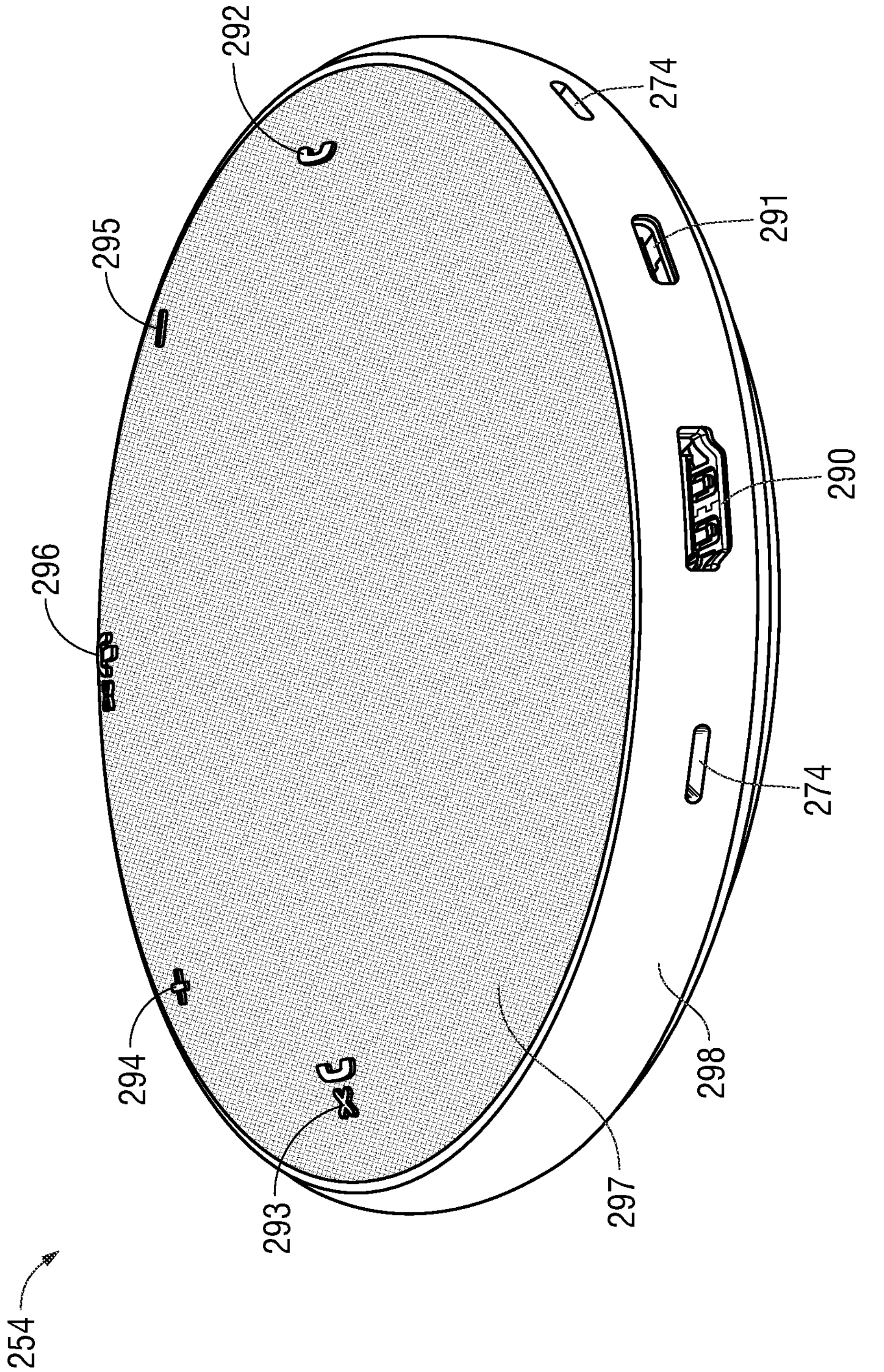
FIG. 2 is a graphic diagram of a fragmented sound box hub device according to an embodiment of the present disclosure.

FIG. 2 is a graphic diagram of a fragmented sound box hub device 254 with a rounded, fragmented sound box housing according to an embodiment of the present disclosure. The fragmented sound box hub device 254 is shown with a top cover 297 with a side ring housing 298. In an embodiment, the top cover 297 may be a sheet of fabric. A bottom housing (not shown) may be used on a bottom surface of the fragmented sound box hub device 254 to encase the components of the fragmented sound box hub device 254 therein. As shown, the rounded, fragmented sound box housing may be of any rounded shape, including a circular, oval, or irregularly-shaped housing components of the rounded, fragmented sound box housing.

The fragmented sound box hub device 254 includes one or more microphones 274. The microphones 274 may be used to detect a user's voice so that a user may engage in a conversation with remotely-located participants to the conversation. For example, during execution of a videoconferencing session a user may use the microphones 274 of the fragmented sound box hub device 254 to communicate to these remotely-located participants to the conversation.

The fragmented sound box hub device 254 includes one or more wired connection points 290, 291. The wired connection points 290, 291 may be used to couple the fragmented sound box hub device 254 to one or more peripheral devices including a display device, a mouse, and a smartphone, among others. In an embodiment, the wired connection points 290, 291 may allow the fragmented sound box hub device 254 to be operatively coupled to an information handling system. In an embodiment, these wired connection points 290, 291 may include an HDMI wired connection point 290 and a USB-C wired connection point 291. The present specification, however, contemplates that other connection points (e.g., serial points) may be formed into the fragmented sound box hub device 254 to operatively couple different peripheral devices.

The fragmented sound box hub device 254, in an embodiment, further includes a plurality of buttons 292, 293, 294, 295, 296. These buttons 292, 293, 294, 295, 296 include a call button 292 used to initiate a phone call with remote participants of a conversation. An end call button 293 may be actuated by a user to end the conversation with remote participants of the conversation. A volume up button 294 may be used by a user to increase the volume of the sound produced by the speaker (not shown in FIG. 2) described in FIG. 1. A volume down button 295 may be used by a user to decrease the volume of the sound produced by the speaker. A mute button 296 may be used by the user to prevent the microphones 274 from capturing the user's voice if and when a side conversation, for example, is taking place at the fragmented sound box hub device 254 and this conversation is not to be heard by the remote participants to the conversation.

Figure 3:
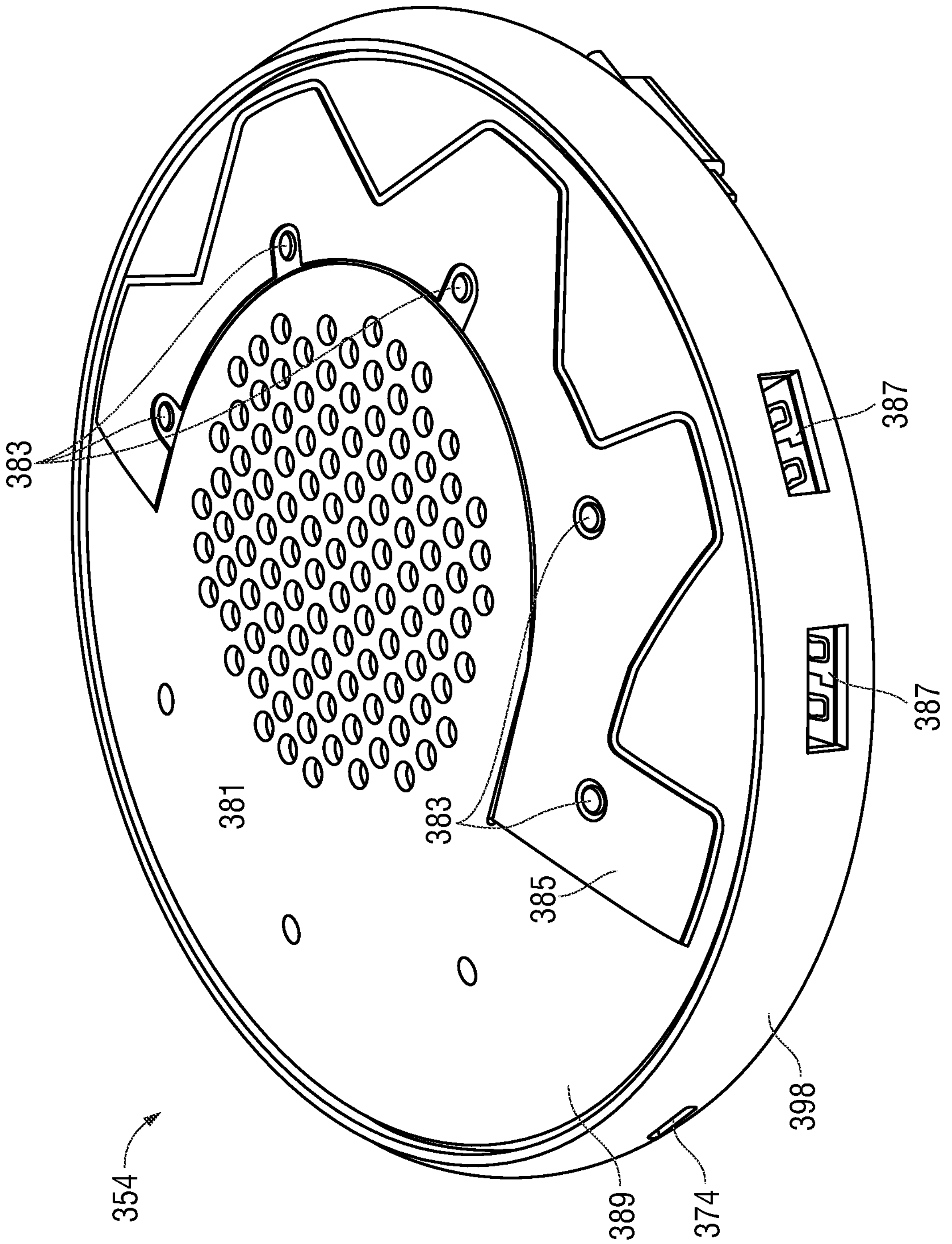
FIG. 3 is a graphic diagram of a fragmented sound box hub device with a rounded, fragmented sound box housing and a top cloth layer removed to expose a perforated plastic top cover according to another embodiment of the present disclosure.

FIG. 3 is a graphic diagram of a fragmented sound box hub device 354 with a top cloth layer (not shown) removed to expose a perforated plastic cover 389 according to another embodiment of the present disclosure. FIG. 3 shows the fragmented sound box hub device 354 without a top fabric cover placed over the perforated plastic cover. The removal of the top fabric cover exposes this perforated plastic cover 389 and a geometrically-slotted flexible touch PCB 385. Again, the fragmented sound box hub device has a rounded, fragmented sound box housing as depicted in the embodiment of FIG. 3.

As described herein, the fragmented sound box hub device 354 includes a housing such as a side ring housing 398. The side ring housing 398 may interface with the perforated plastic cover 389 to form an upper portion of the fragmented sound box hub device 354. A bottom housing cover (not shown) may also be coupled to the side ring housing 398 to form the remaining portions of the housing of the fragmented sound box hub device 354.

As described herein, the fragmented sound box hub device 354 may include one or more wired connection points 387. In this example embodiment shown in FIG. 3, the wired connection points 387 include a universal serial bus (USB) port that is configured to receive a USB 1.0, 1.1, 2.0, 3.0, 3.1, 3.2, or 4 among other types of USB cables. The present specification, however, contemplates that other connection points (e.g., serial points) may be formed into the fragmented sound box hub device 354 to operatively couple different peripheral devices.

The perforated plastic cover 389 may include one or more perforations 381 that allow sound from the speaker (not shown) to exit the housing of the fragmented sound box hub device 354. Additionally, sounds from each of the fragmented sound chambers (not shown) described herein may escape the housing of the fragmented sound box hub device 354 via these perforations 381. The size and shape of the perforations 381 may be optimized to allow sound to escape the housing while still providing a rigid support structure to prevent objects from entering the housing and destroying, for example, a diaphragm of the speaker or other hardware secured within the housing.

The fragmented sound box hub device 354, in an embodiment, may further include a geometrically-slotted flexible touch PCB 385. The geometrically-slotted flexible touch PCB 385 may be formed along a top surface of the perforated plastic cover 389 where, for example, buttons are to be arranged on the fragmented sound box hub device 354. As described in connection with FIG. 2, these buttons include a call button, a call disconnect button, a volume up button, a volume down button, and a mute button among other dedicated buttons used to provide input to the fragmented sound box hub device 354. The geometrically-slotted flexible touch PCB 385 may be flexible enough to be operatively coupled to the surface of the perforated plastic cover 389 along curved portions of the perforated plastic cover 389. The geometrically-slotted flexible touch PCB 385 may further include push-button locations 383 where one of the buttons are to be located on the fragmented sound box hub device 354. The push-button locations 383 may, in an example embodiment, use capacitive pads whose capacitive properties change when a user presses down on the capacitive pads. Other types of buttons may be integrated into the geometrically-slotted flexible touch PCB 385 to receive input from the user and the present specification contemplates these other types of buttons.

The fragmented sound box hub device 354 includes one or more microphones 374. The microphones 374 may be used to detect a user's voice so that a user may engage in a conversation with remotely-located participants to the conversation. For example, during execution of a videoconferencing session a user may use the microphones 374 of the fragmented sound box hub device 354 to communicate to these remotely-located participants to the conversation.

Figure 4:
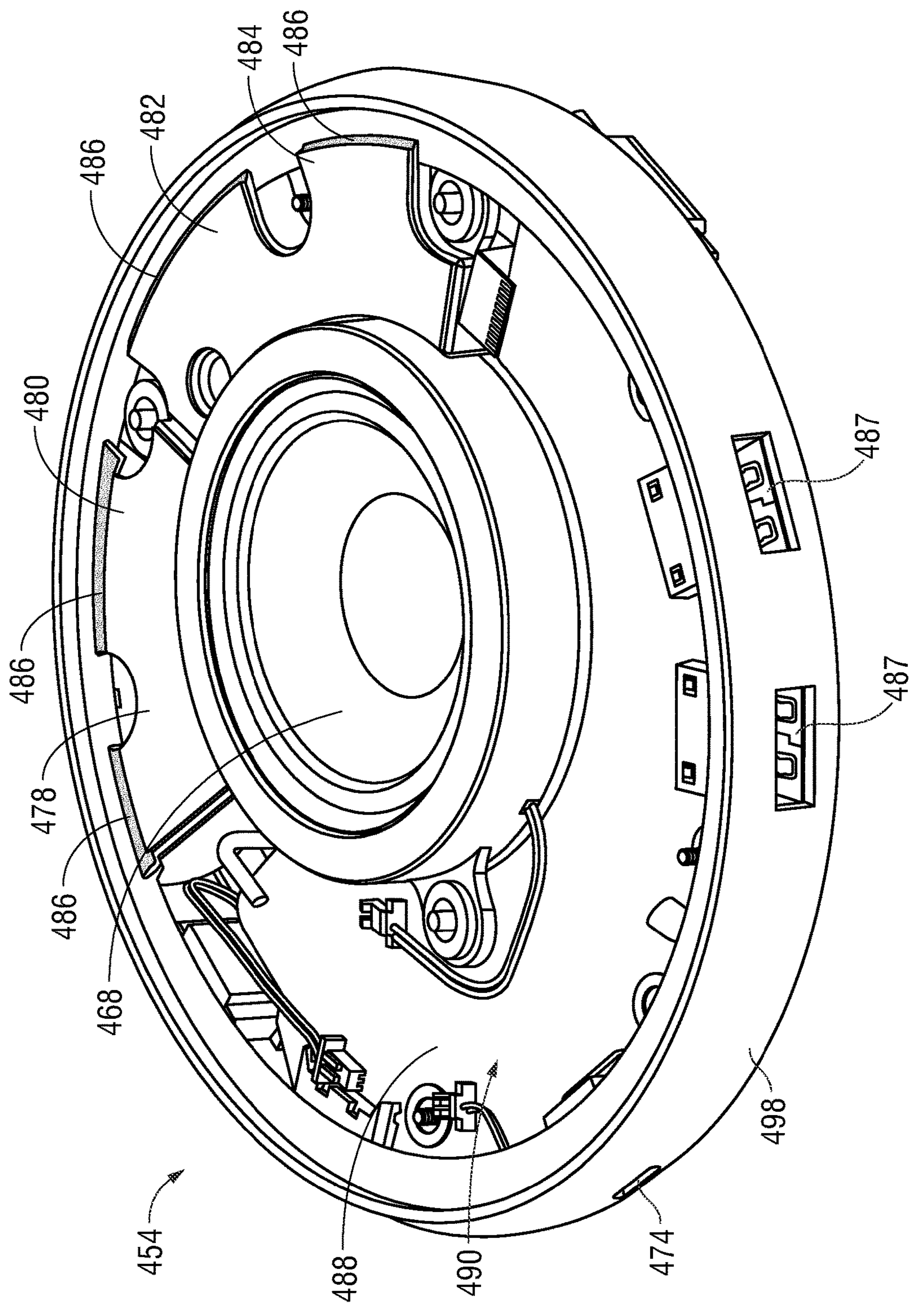
FIG. 4 is a graphic diagram of a fragmented sound box hub device with a top cloth layer and perforated plastic cover removed according to an embodiment of the present disclosure.

FIG. 4 is a graphic diagram of a fragmented sound box hub device 454 with a top cloth layer (not shown) and perforated plastic cover (not shown) removed according to an embodiment of the present disclosure. The removal of the top cloth layer and perforated plastic cover exposes the fragmented sound chambers 478, 480, 482, 484, the speaker 468, and the fragmented sound box base PCB 488. As described herein, the fragmented sound box hub device 454 may include a plurality of fragmented sound chambers 478, 480, 482, 484 and the layout and number of fragmented sound chambers 478, 480, 482, 484 shown in FIG. 4 is for illustrative purposes to show an example arrangement and number.

As described herein, the speaker 468 may be used to provide audio to a user. The speaker may include driving hardware that actuates a diaphragm up and down to produce sound waves. These sound waves may escape the housing of the fragmented sound box hub device 454 via one or more perforations formed in a perforated plastic cover described herein in FIG. 3. Again, the fragmented sound chambers 478, 480, 482, 484 may each be sized to resonate at a specific frequency in order to modify or enhance the sounds produced by the driving of the speaker 468. Because the fragmented sound chambers 478, 480, 482, 484 have its own resonance, the tone quality of the sounds produced by the speaker 468 and received within each of the fragmented sound chambers 478, 480, 482, 484 may be augmented to increase the tone quality of the sound produced by the fragmented sound box hub device 454. In an embodiment, the sizing and internal dimensions of each of the fragmented sound chambers 478, 480, 482, 484 may be selected so that those frequency bands supported are enhanced across multiple frequencies.

In an embodiment, one or more of the fragmented sound chambers 478, 480, 482, 484 may be located radially around the speaker 468 that is placed at a central location within the rounded, fragmented sound box housing of the fragmented sound box hub device 454. For example, a first fragmented sound chamber 478 and second fragmented sound chamber 480 may be formed in a first section between an outer portion of the speaker 468 and the outer edge side ring cover 498 of the rounded, fragmented sound box housing of the fragmented sound box hub device 454. In another example, a third fragmented sound chamber 482 and fourth fragmented sound chamber 484 may be formed in a second section between an outer portion of the speaker 468 and the outer edge side ring cover 498 of the rounded, fragmented sound box housing of the fragmented sound box hub device 454. In an embodiment, the first fragmented sound chamber 478, second fragmented sound chamber 480, third fragmented sound chamber 482, and fourth fragmented sound chamber 484 may be formed out of a plastic shell or other material that creates enclosed spaces of varying sized for the sound resonance enhancement from the speaker 468 to resonate therein. In an embodiment, a fragmented sound box base PCB 488 may be used to form a wall of the fragmented sound chambers 478, 480, 482 or 484 in some embodiments thereby decreasing the amount of material used to form the plurality fragmented sound chambers 478, 480, 482 and 484 in the fragmented sound box hub device 454.

In an embodiment, a hardware portion cavity 490 may be formed around the speaker 468 with the fragmented sound box base PCB 488 in the shown interior portions of the rounded, fragmented sound box housing of the fragmented sound box hub device 454 forming a cavity to include one or more hardware components as well as data connectors and a microphone device that may align with apertures 474 and 487 on the side ring housing 498 in embodiments herein. In an embodiment, the hardware portion cavity 490 may be located at a side of the rounded, fragmented sound box housing opposite of the centrally disposed speaker 468 from the plurality of fragmented sound chambers 478, 480, 482 and 484 such that the connectors and microphones are opposite to the fragmented sound chambers used to resonate at certain sound frequencies to increase the tone quality of those frequencies as described herein. This however may create an issue spacing and locating buttons on a top cover (not shown) of the rounded, fragmented sound box housing in order to accommodate the fragmented sound chambers 478, 480, 482, and 484. Accordingly, a geometrically-slotted flexible PCB may be used to provide a capacitive touch ability or other button type that may be disposed on the fragmented sound chambers 478, 480, 482, and 484 in the top cover of the rounded, fragmented sound box housing.

Any number of fragmented sound chambers 478, 480, 482, 484 may be formed within the rounded, fragmented sound box housing of the fragmented sound box hub device 454. For example, a below-speaker fragmented sound chamber may be an additional sound chamber that, rather than being formed radially from the speaker 468, is formed below the speaker 468. In this embodiment, the hardware of the speaker 468, a fragmented sound box base PCB 488, and/or the rounded, fragmented sound box housing of the fragmented sound box hub device 454 may be used to define the size of this below-speaker fragmented sound chamber. Again, along with the other fragmented sound chambers 478, 480, 482, and 484, the below-speaker fragmented sound chamber may resonate at yet another frequency different from any of the other fragmented sound chambers 478, 480, 482, and 484 thereby increasing the tone qualities of the audio emitted by the speaker 468 during operation of the fragmented sound box hub device 454.

In an embodiment, the fragmented sound box hub device 454 may include a microphone 474. The microphone 474 may be located at the shown aperture in the side ring housing 498 and used to detect a user's voice so that a user may engage in a conversation with remotely-located participants to the conversation. For example, during execution of a videoconferencing session a user may use the microphone 474 of the fragmented sound box hub device 454 to communicate to these remotely-located participants to the conversation.

As described herein, the fragmented sound box hub device 454 includes a housing such as a side ring housing 498. The side ring housing 498 may interface with the perforated plastic cover (not shown) acting as a rounded, fragmented sound box housing top cover to form an upper portion of the fragmented sound box hub device 454. A bottom housing cover (not shown) may also be coupled to the side ring housing 498 to form the remaining portions of the rounded, fragmented sound box housing of the fragmented sound box hub device 454.

As described herein, the fragmented sound box hub device 454 may include one or more wired connection points 487. In this example embodiment shown in FIG. 4, the wired connection points 487 include a universal serial bus (USB) port that is configured to receive a USB 1.0, 1.1, 2.0, 3.0, 3.1, 3.2, or 4 among other types of USB cables. The present specification, however, contemplates that other connection points (e.g., serial points) may be formed into the fragmented sound box hub device 454 to operatively couple different peripheral devices.

In an embodiment, the fragmented sound box hub device 454 may include one or more vibration isolation members 486. The vibration isolation member 486 may be affixed between each of the fragmented sound chambers 478, 480, 482, 484 and an interior side of the side ring housing 498 to reduce the amount of vibration passed to the side ring housing 498 of the fragmented sound box hub device 454 while still permitting the fragmented sound chambers 478, 480, 482, and 484 to resonate. This prevents the resonant vibrations from each of the fragmented sound chambers 478, 480, 482, 484 from vibrating the fragmented sound box hub device 454 to a point where it can even "walk" or bounce along a surface that the fragmented sound box hub device 454 has been placed. Still further, the vibration isolation members 486 may allow any of the fragmented sound chambers 478, 480, 482, 484 to vibrate according to the resonant frequency they were built for thereby allowing the sounds to propagate to the user increasing the tone qualities of the audio emitted by the fragmented sound box hub device 454 during operation of the fragmented sound box hub device 454. In an embodiment, the vibration isolation members 486 may be made of a flexible material such as a silicone, rubber, foam, or cloth that allows for the independent vibration of the fragmented sound chambers 478, 480, 482, 484 without imparting any or imparting very little vibration to the housing of the fragmented sound box hub device 454.

The fragmented sound box base PCB 488 may operatively couple the hardware to each other as described herein. For example, the fragmented sound box base PCB 488 may be used to form several components of hardware such as that associated with the fragmented sound box processor, the fragmented sound box memory device, the sound box PMU, speaker driver circuitry, the sound box radio and RF front end, the data connectors, the speaker in some embodiments, any power connectors, and the microphone among other hardware thereon. For example, the fragmented sound box base PCB 488 may operatively couple the wired connectors 487 (e.g., USB connectors) to the fragmented sound box processor as described herein in connection with FIG. 1. The fragmented sound box base PCB 488 may also include a lead that operatively couples the fragmented sound box processor to a geometrically-slotted flexible touch PCB that may be installed over the fragmented sound chambers 478, 480, 482, and 484. In an embodiment, other PCBs may be included within the housing of the fragmented sound box hub device 454.

Figure 5:
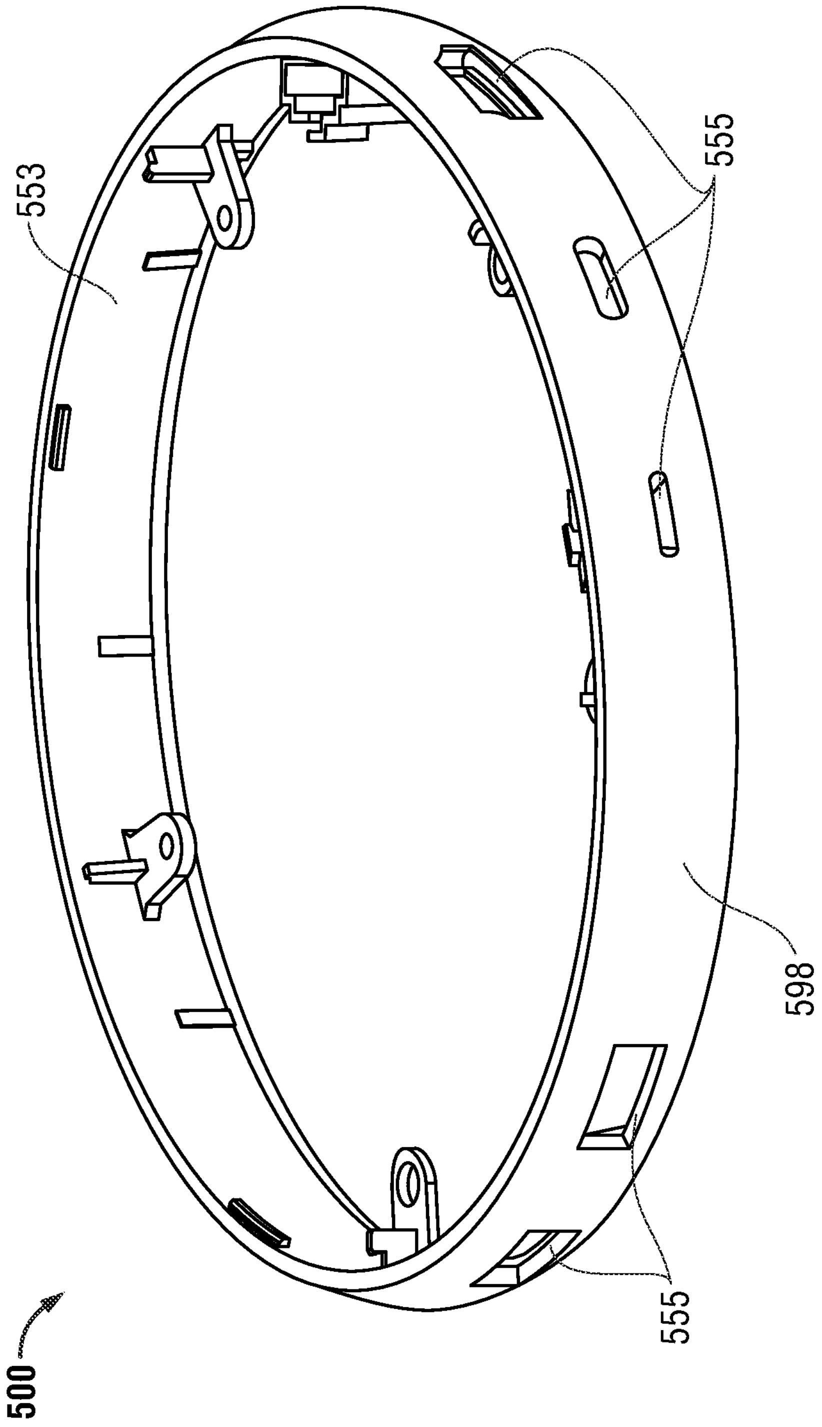
FIG. 5 is a graphic diagram of a ring cover of a fragmented sound box hub device according to an embodiment of the present disclosure.

FIG. 5 is a graphic diagram of a side ring housing 598 of a rounded, fragmented sound box hub device according to an embodiment of the present disclosure. As described herein, the side ring housing 598 may be used to form a portion of the rounded, fragmented sound box housing of the fragmented sound box hub device described herein. The side ring housing 598 may include one or more ports or holes 555 formed therein where the wired connection points (not shown) are placed when the fragmented sound box is manufactured. In an embodiment, the side ring housing 589 may be of an oblate shape to provide an aesthetic, seamless side of the rounded, fragmented sound box housing and provide for additional room for ports 555.

In an embodiment, the side ring housing 598 includes a graphene coating 553 coated onto an interior surface of the side ring housing 598. The graphene coating 553 may receive heat from the operation of the hardware of the fragmented sound box (e.g., a fragmented sound box processor) and dissipate that heat. This is done so that heat from these devices will not reach the hand of the user when the user picks up the fragmented sound box.

Figure 6:
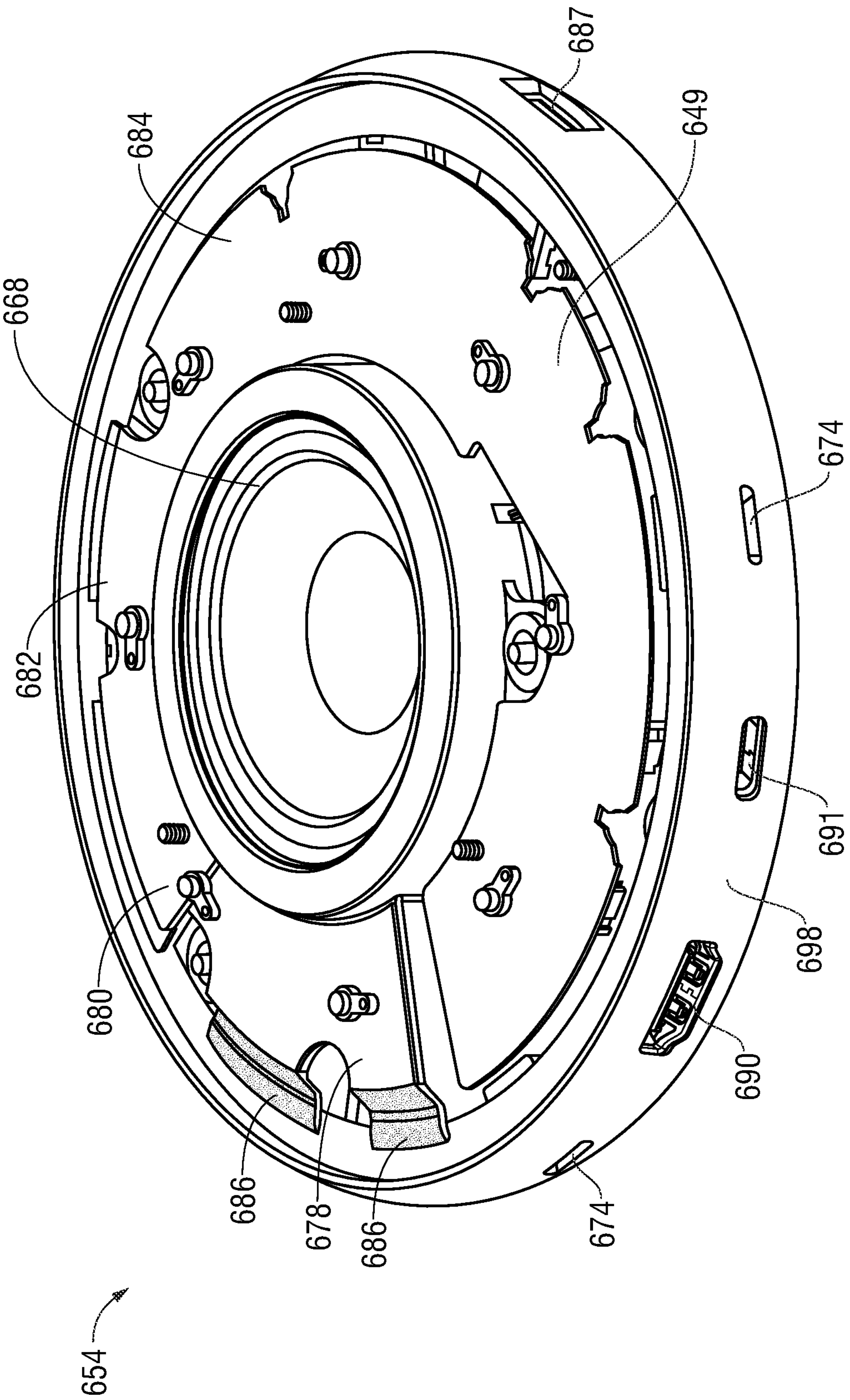
FIG. 6 is a graphic diagram of a fragmented sound box hub device with a printed circuit board (PCB) placed within the rounded, fragmented sound box housing according to an embodiment of the present disclosure.

FIG. 6 is a graphic diagram of a fragmented sound box hub device 654 with a secondary PCB 649 placed within the housing according to an embodiment of the present disclosure. As described herein, the fragmented sound box hub device 654 may include more than one PCB apart from the fragmented sound box base PCB (e.g., 488, FIG. 4) shown herein. This secondary PCB 649 may be operatively coupled to one or more hardware devices within the fragmented sound box hub device 654 and/or the fragmented sound box base PCB described herein. In an embodiment, the secondary PCB 649 may be used to form a wall, for example a top wall, of one or more of the fragmented sound chambers 678, 680, 682, 684 formed within the fragmented sound box hub device 654.

As described herein, the centrally disposed speaker 668 may be used to provide audio to a user. The speaker may include speaker driver hardware that actuates a diaphragm up and down to produce sound waves. These sound waves may escape the rounded, fragmented sound box housing of the fragmented sound box hub device 654 via one or more perforations formed in a perforated plastic cover described herein in FIG. 6. Again, the plural fragmented sound chambers 678, 680, 682, 684 may each be sized to resonate at a specific sound frequency band in order to modify or enhance the sounds produced by the driving of the speaker 668. Because the air inside each of the fragmented sound chambers 678, 680, 682, 684 have its own resonance, the tone quality of the sounds produced by the speaker 668 and received within each of the fragmented sound chambers 678, 680, 682, 684 may be augmented to increase the tone quality of the sound produced by the fragmented sound box hub device 654. In an embodiment, the sizing of each of the fragmented sound chambers 678, 680, 682, 684 may be selected so that the sound frequencies are enhanced across plural frequency bands.

The fragmented sound box hub device 654 includes one or more wired connector ports 687, 690, 691. The wired connector ports 687, 690, 691 may be used to couple the fragmented sound box hub device 654 to one or more peripheral devices including a display device, a mouse, and a smartphone, among others. In an embodiment, the wired connector ports 687, 690, 691 may allow the fragmented sound box hub device 654 to be operatively coupled to an information handling system. In an embodiment, these wired connectors 687, 690, 691 may include an HDMI wired connector port 690, a USB-C wired connector port 691, and a USB wired connector port 687. The present specification, however, contemplates that other connection points (e.g., serial points) may be formed into the fragmented sound box hub device 654 to operatively couple different peripheral devices.

The fragmented sound box hub device 654 includes one or more microphones 674. The microphones 674 may be used to detect a user's voice so that a user may engage in a conversation with remotely-located participants to the conversation. For example, during execution of a videoconferencing session a user may use the microphones 674 of the fragmented sound box hub device 654 to communicate to these remotely-located participants to the conversation.

In an embodiment, the side ring housing 698 includes a graphene coating coated onto an interior surface of the side ring housing 698. The graphene coating may receive heat from the operation of the hardware of the fragmented sound box (e.g., a fragmented sound box processor) and dissipate that heat. This is done so that heat from these devices will not reach the hand of the user when the user picks up the fragmented sound box.

In an embodiment, the fragmented sound box hub device 654 may include one or more vibration isolation members 686. The vibration isolation member 686 may be affixed between each of the fragmented sound chambers 678, 680, 682, 684 and an interior of the side ring housing 498 to reduce the amount of vibration passed to the rounded, fragmented sound box housing of the fragmented sound box hub device 654. This prevents the resonant vibrations from each of the fragmented sound chambers 678, 680, 682, 684 from vibrating the fragmented sound box hub device 654 and rounded, fragmented sound box housing to a point where it can "walk" or bounce along a surface that the fragmented sound box hub device 654 has been placed. Still further, the vibration isolation members 486 may allow any of the fragmented sound chambers 678, 680, 682, 684 to vibrate according to the resonant frequency they were built for thereby allowing the sounds to propagate to the user increasing the tone qualities of the audio emitted by the fragmented sound box hub device 654 during operation of the fragmented sound box hub device 654. In an embodiment, the vibration isolation members 686 may be made of a flexible material such as a silicone, rubber, foam, or cloth that allows for the independent vibration of the fragmented sound chambers 678, 680, 682, 684 without imparting any or imparting very little vibration to the housing of the fragmented sound box hub device 654.

Figure 7:
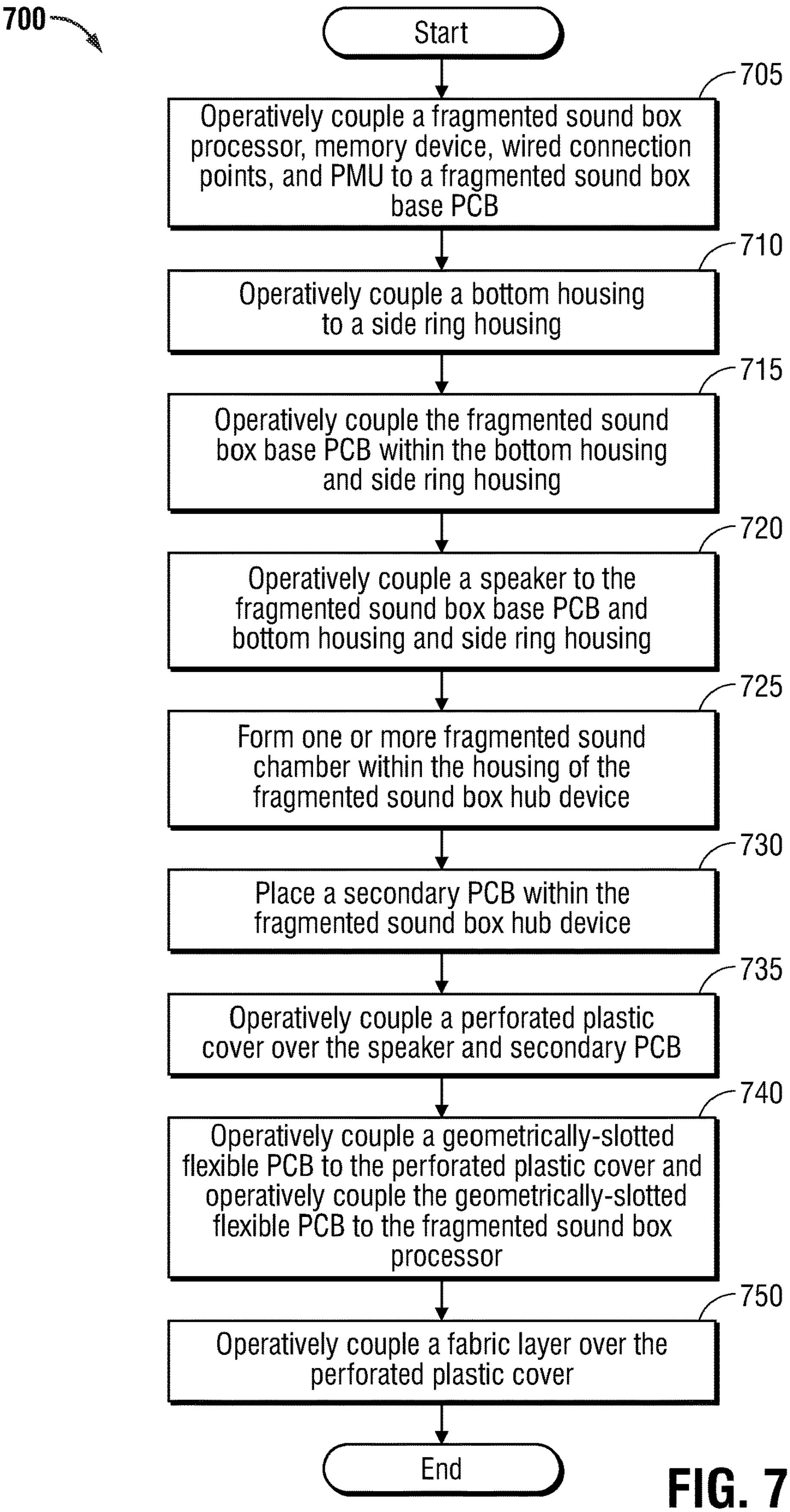
FIG. 7 is a flow diagram of a method of manufacturing a fragmented sound box hub device according to another embodiment of the present disclosure.

FIG. 7 is a flow diagram of a method 700 of manufacturing a fragmented sound box hub device according to another embodiment of the present disclosure. Some of the manufacturing steps and processes described in connection with FIG. 7 may occur concurrently as the hardware is assembled to form the fragmented sound box hub device described herein. Further, the resulting fragmented sound box hub device may have additional functionality such as operability as a teleconferencing device and a peripherals hub, but with enhanced audio sound quality according to embodiments herein. Consequently, the steps and processes may be conducted in a different order than that shown in the flowchart without going beyond the scope of the present method 700.

The method 700 may include, at block 705, operatively coupling a fragmented sound box processor, memory device, and PMU to a fragmented sound box PCB. This process may include coupling this hardware to each other via electrical leads formed on a surface of the fragmented sound box base PCB. The fragmented sound box base PCB may be circular or another shape to fit within the housing of the fragmented sound box hub device. The placement of this hardware on the surface of the fragmented sound box base PCB may be determined based on the placement of other hardware within the fragmented sound box hub device such that space within the housing of the fragmented sound box hub device may be utilized as efficiently as possible and leave room within the fragmented sound box hub device for fragmented sound chambers on one side. In an embodiment, because the fragmented sound box base PCB may form a wall of the fragmented sound chambers, the placement of this hardware on the fragmented sound box base PCB may be located in a hardware portion of the fragment sound box housing on a side of the fragmented sound box housing having plural connectors, power systems connection, microphones, and other hardware ports such that the resonant frequencies created within the fragmented sound chambers are not affected by their presence. In an example embodiment, the hardware portion of the fragmented sound box housing may be disposed opposite in the rounded form factor from the location of the fragmented sound chambers which will radiate resonant sound from a different side or portion of the fragmented sound box housing.

The method 700 includes operatively coupling a bottom housing cover to a side ring housing forming a cup-shaped rounded, fragmented sound box housing of the fragmented sound box hub device in some embodiments at block 710. The rounded, fragmented sound box housing may be circular, oval, or some other rounded shape such that fragmented sound chambers according to embodiments herein may resonate plural sound frequency bands from a centrally disposed speaker. The bottom housing cover may be operatively coupled to the side ring housing via any coupling means including mechanical couplings (e.g., interference or snap fit structures such as lips, edges or posts and receivers, or via clips, bolts, screws, glue, and the like) and welding methods (e.g., ultrasonic welding, melting and the like). The shape and size of the bottom housing and side ring housing may be selected to fit the hardware such as that mounted on the fragmented sound box base PCB, secondary PCB and flexible fragmented slot shaped PCB therein as well as a speaker and the fragmented sound chambers described herein. The side ring housing is formed to include one or more port openings around its surface to accommodate ports for data connectors such as USB, HDMI, or other types of data connector ports, for microphone apertures to channel sound to a microphone device, for power connectivity ports such as for a power source cable connection if not part of the USB or other data port connection.

At block 715, the method 700 includes operatively coupling the fragmented sound box base PCB within the bottom housing and side ring housing of the rounded, fragmented sound box housing. In an embodiment, the fragmented sound box base PCB may be circular, oval or another rounded shape to fit in at least a portion of the rounded, fragmented sound box housing. The fragmented sound box base PCB may include a central location cutout or mounting in a centralized location of the rounded, fragmented sound box housing where a speaker may be placed with enough space in the rounded, fragmented sound box housing for one or more fragmented sound chambers to be formed thereon. Alternatively, or additionally, the fragmented sound box base PCB may be formed so that one or more fragmented sound chambers may be formed radially from the speaker location and beside the fragmented sound box base PCB in a different portion of the fragmented sound box. The fragmented sound box base PCB may be operatively coupled to bottom housing cover via mounting the fragmented sound box base PCB to the bottom housing cover. This may be done via any mechanical coupling including interference fit structures or weldable mounting structures between the bottom housing cover and the fragmented sound box base PCB in any combination. For example, posts and receivers may be formed in the bottom housing cover and the fragmented sound box base PCB. In an embodiment, one or more of the data port connector such as for USB or HDMI, the microphone, or any power receiver structure may be mounted on the interior of the side ring housing at a data port aperture, a microphone aperture, or power port aperture respectively. Further, the fragmented sound box base PCB may include port hardware including the data port connectors, such as a USB or HDMI port connector, a microphone, or power receiver mounted on the fragmented sound box base PCB at a data port aperture, a microphone aperture, or power port aperture respectively in some embodiments. Further, any auxiliary processing resources or memory of the fragmented sound box of the present disclosure may be operatively coupled or mounted on the fragmented sound box base PCB in the hardware portion of the rounded, fragmented sound box housing according to embodiments herein. As described, the port hardware also may be on a side of the rounded, fragmented sound box housing and the side ring housing to accommodate such port hardware and other hardware to support the peripheral hub, auxiliary processing and storage, and teleconferencing functionalities of the fragmented sound box according to embodiments herein.

The method 700 further includes, at block 720, operatively coupling a speaker to in the rounded, fragmented sound box housing and to the bottom housing in an embodiment. In a further embodiment, the speaker may be operatively coupled to the fragmented sound box PCB. The speaker, as described in an embodiment, herein, may be centrally located within the rounded, fragmented sound box. This central location of the speaker allows for the formation of one or more fragmented sound chambers within the fragmented sound box hub device. The speaker may be operatively coupled to the fragmented sound box processor, a speaker driver, and other hardware via a wired connection and/or metal traces formed on the fragmented sound box base PCB. In an embodiment, the speaker may be coupled to the housing of the fragmented sound box (e.g., the bottom housing and side ring housing) via a support member so that a fragmented sound chamber may be formed below the speaker as described herein.

The method 700 further includes forming one or more fragmented sound chambers within the rounded, fragmented sound box housing of the fragmented sound box hub device as described herein at block 725. The formation of the fragmented sound chambers may, in an embodiment, may include forming plastic shells or other boxes made of other materials that creates an enclosed space for the sound from the speaker to resonate into the fragmented sound chambers therein at plural different specific sound frequency bands corresponding to sizes of the fragmented sound chambers. In another embodiment, the layout of the fragmented sound box base PCB and housing pieces of the fragmented sound box (e.g., the bottom housing, the side ring housing, and a perforated plastic cover) may be used to form one or more fragmented sound chambers. Further, the fragmented sound chambers may be adjacent to one another and on one side around the centrally disposed speaker in the rounded, fragmented sound box housing.

Again, these fragmented sound chambers may be of a plurality of sizes to resonate at one or more specific sound frequency bands in order to modify or enhance the sounds produced by the driving of the speaker. Because the air inside each of the fragmented sound chambers have its own resonance, the tone quality of the sounds produced by the speaker and received within each of the fragmented sound chambers may be augmented to increase the tone quality of the sound produced by the fragmented sound box. In an embodiment, the sizing of each of the fragmented sound chambers may be selected so that those sound frequency bands are enhanced more equally across several frequencies. For example, one or more large, fragmented sound chambers may be used for bass range sound frequency bands.

The method 700 further includes, at block 730, optionally placing a secondary PCB within the fragmented sound box hub device. As described herein, the secondary PCB may or may not be placed within the rounded, fragmented sound box housing of the fragmented sound box hub device. In an embodiment the secondary PCB may be used to operatively couple a geometrically-slotted flexible touch PCB to the fragmented sound box processor on the fragmented sound box base PCB. The secondary PCB may, in an example embodiment, provide wire traces used to operatively couple one or more wired connection points to the fragmented sound box processor formed on the fragmented sound box base PCB. Further, in some embodiments, the secondary PCB may operate as a top for one or more fragmented sound chambers in an embodiment to complete the resonance chamber and include one or more sound outlet apertures for each fragmented sound chamber covered by the secondary PCB.

At block 735, a perforated plastic cover may be operatively coupled to the side ring housing of the fragmented sound box hub device. This encloses the rounded, fragmented sound box housing and covers the speaker, secondary PCB, fragmented sound box base PCB, and fragmented sound chambers so that they cannot be accessed or touched by a user. The perforated plastic cover may include one or more perforations that allow sound from the speaker itself to exit the rounded, fragmented sound box housing of the fragmented sound box hub device. Additionally, sounds from each of the fragmented sound chambers described herein may escape the housing of the fragmented sound box hub device via these perforations. The size and shape of the perforations may be optimized to allow sound to escape the housing while still providing a rigid support structure to prevent objects from entering the rounded, fragmented sound box housing and damaging, for example, a diaphragm of the speaker or other hardware secured within the rounded, fragmented sound box housing.

The method 700 further includes, at block 740, operatively coupling a geometrically-slotted flexible touch PCB to the perforated plastic cover and operatively couple the geometrically-slotted flexible touch PCB to the fragmented sound box processor. The geometrically-slotted flexible touch PCB may be affixed to the perforated plastic cover via any coupling means including mechanical couplings (e.g., interference fit structures, clips, posts and receivers, fasteners, bolts screws, glue) and welding methods (e.g., ultrasonic welding, melting and the like). The geometrically-slotted flexible touch PCB may be operatively coupled to the fragmented sound box processor via a serial connection or metal traces formed on the secondary PCB and/or fragmented sound box base PCB.

The geometrically-slotted flexible touch PCB may be formed along a top surface of the perforated plastic cover where, for example, buttons are to be arranged on the fragmented sound box. As described in connection with FIG. 2, these buttons include a call button, a call disconnect button, a volume up button, a volume down button, and a mute button among other dedicated buttons used to provide input to the fragmented sound box. The geometrically-slotted flexible touch PCB may be flexible enough to be operatively coupled to the surface of the perforated plastic cover along curved portions of the perforated plastic cover. The geometrically-slotted flexible touch PCB may further include push-button locations where one of the buttons are to be located on the fragmented sound box hub device. The button locations may, in an example embodiment, use capacitive pads whose capacitive properties change when a user presses down on the capacitive pads. Other types of buttons may be integrated into the geometrically-slotted flexible touch PCB to receive input from the user and the present specification contemplates these other types of buttons.

At block 750, a fabric layer may be operatively coupled to the surface of the perforated plastic cover. Again, the fabric layer may be coupled to the perforated plastic cover via any coupling means including mechanical couplings (e.g., hooks, bolts, screws, staples, glue) and welding methods (e.g., ultrasonic welding, melting and the like). This fabric layer may increase the aesthetics of the fragmented sound box hub device as well as prevent any objects from entering the perforations formed into the perforated plastic cover as described herein. At this point, the method 700 may end.

The blocks of the flow diagrams of FIG. 7 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A fragmented sound box hub device comprising:

a rounded, fragmented sound box housing having a bottom housing cover and a side ring housing having a plurality of apertures for data ports and a microphone;

a sound box processor, a sound box memory device, and a sound box power management unit (PMU) disposed on a base printed circuit board (PCB) within a hardware chamber of the rounded, fragmented sound box housing;

a speaker centrally disposed in the rounded fragmented soundbox housing; and a plurality of adjacent fragmented sound chambers operatively coupled to the speaker disposed along the speaker in the rounded, fragmented sound box housing opposite to the hardware chamber, where a portion of the fragmented sound chambers are of a plurality of different sizes to resonate sounds produced by the speaker at a corresponding plurality of sound frequency bands; and the plurality of adjacent fragmented sound chambers are enclosed and operatively coupled to the side ring housing via a vibration isolation member of a vibration absorbing material.

2. The fragmented sound box hub device of claim 1 further comprising:

a geometrically-slotted flexible touch PCB mounted over the plurality of fragmented sound chambers to provide touch buttons over the plurality of fragmented sound chambers.

3. The fragmented sound box hub device of claim 1 further comprising:

a geometrically-slotted flexible touch PCB mounted under a radially curved surface of a top housing cover of the rounded, fragmented sound box housing such that the touch buttons are operably disposed on the top cover of the rounded, fragmented sound box housing.

4. The fragmented sound box hub device of claim 1 further comprising:

a fragmented sound box radio wirelessly coupling the fragmented sound box to a host information handling system.

5. The fragmented sound box hub device of claim 1 further comprising:

a heat resistant coating coated onto an interior surface of the side ring housing reduce a temperature of the rounded, fragmented sound box housing.

6. The fragmented sound box hub device of claim 1 wherein the heat resistant coating is a graphene coating.

7. The fragmented sound box hub device of claim 1, further comprising:

a perforated plastic top surface of the top housing cover to allow sound to pass through the perforations.

8. The fragmented sound box hub device of claim 7, further comprising a fabric formed over the perforated plastic top.

9. A fragmented sound box hub device comprising:

a rounded, fragmented sound box housing having a bottom housing cover and a side ring housing having a plurality of apertures for data ports and a microphone;

a sound box processor, a sound box memory device, and a sound box power management unit (PMU) disposed on a base printed circuit board (PCB) within a hardware chamber of the rounded, fragmented sound box housing;

a speaker centrally disposed in the rounded fragmented soundbox housing; and a plurality of adjacent fragmented sound chambers operatively coupled to the speaker and disposed along the speaker in the rounded, fragmented sound box housing opposite to the hardware chamber, where a portion of the fragmented sound chambers are of a plurality of different sizes to resonate sounds produced by the speaker at a corresponding plurality of sound frequency bands; and a geometrically-slotted flexible touch PCB mounted over the plurality of fragmented sound chambers to provide touch buttons on a top housing cover of the rounded, fragmented sound box housing over the plurality of fragmented sound chambers.

10. The fragmented sound box hub device of claim 9 further comprising:

the geometrically-slotted flexible touch PCB mounted over the plurality of fragmented sound chambers and under a radially curved surface of the top housing cover of the rounded, fragmented sound box housing to provide the touch buttons over the plurality of fragmented sound chambers.

11. The fragmented sound box hub device of claim 9 further comprising:

the plurality of adjacent fragmented sound chambers are enclosed and operatively coupled to the side ring housing via a vibration isolation member of a vibration absorbing material.

12. The fragmented sound box hub device of claim 9 further comprising:

a second PCB formed over the fragmented sound chambers and the base PCB to support the top housing cover and the geometrically-slotted flexible touch PCB.

13. The fragmented sound box hub device of claim 9 wherein the geometrically-slotted flexible touch PCB is integrated on to the top housing cover of the rounded, fragmented sound box housing.

14. The fragmented sound box of hub device claim 9 further comprising:

a heat resistant coating coated onto an interior surface of the side ring housing reduce a temperature of the rounded, fragmented sound box housing.

15. The fragmented sound box of hub device claim 9 wherein the side ring housing has an oblate shape.

16. A fragmented sound box hub device comprising:

a rounded, fragmented sound box housing having a bottom housing cover and a side ring housing having a plurality of apertures for data ports and a microphone;

a sound box processor, a sound box memory device, and a sound box power management unit (PMU) disposed on a base printed circuit board (PCB) within a hardware chamber of the rounded fragmented sound box housing;

a speaker centrally disposed in the rounded, fragmented soundbox housing; and a first fragmented sound chamber and a second fragmented sound chamber operatively coupled to the speaker and disposed between the speaker and the ring side housing in the rounded, fragmented sound box housing, where the first fragmented sound chamber and the second fragmented sound chamber are operatively coupled to the side ring housing via a vibration isolation member of a vibration absorbing material;

the first fragmented sound chamber having a first size corresponding to resonate a first sound frequency band;

the second fragmented sound chamber having a second size corresponding to resonate a second sound frequency band; and a geometrically-slotted flexible touch PCB mounted over the first fragmented sound chamber and the second fragmented sound chamber to provide touch buttons over the first fragmented sound chamber and the second fragmented sound chamber.

17. The fragmented sound box hub device of claim 16 further comprising:

the geometrically-slotted flexible touch PCB mounted under a radially curved surface of a top housing cover of the fragmented sound box housing to provide the touch buttons in the top housing cover.

18. The fragmented sound box hub device of claim 16 further comprising:

the first fragmented sound chamber is adjacent to the second fragmented sound chamber in the rounded, fragmented sound box.

19. The fragmented sound box hub device of claim 16 further comprising:

a second PCB formed over the first fragmented sound chamber, the second fragmented sound chamber, and the base PCB to support the top housing cover and the geometrically-slotted flexible touch PCB.

20. The fragmented sound box hub device of claim 16 further comprising:

a heat resistant coating coated onto an interior surface of the side ring housing to reduce a temperature of the rounded, fragmented sound box housing.

* * * * *